(No Model.) 4 Sheets—Sheet 3.

A. M. TODD.
PEPPERMINT PLANTER.

No. 581,966. Patented May 4, 1897.

Witnesses: Walter S. Wood, D. Eldred Wood

Inventor: Albert M. Todd
By Fred L. Chappell Atty.

(No Model.)  4 Sheets—Sheet 4.
A. M. TODD.
PEPPERMINT PLANTER.
No. 581,966.  Patented May 4, 1897.
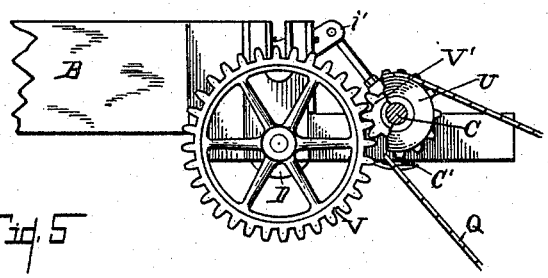
Fig. 5
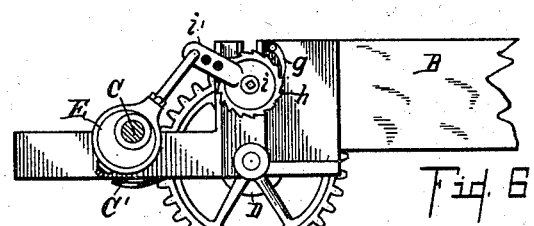
Fig. 6
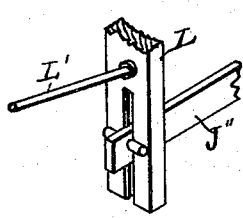
Fig. 10
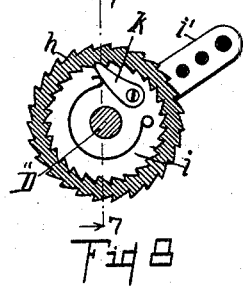
Fig. 7
Fig. 8
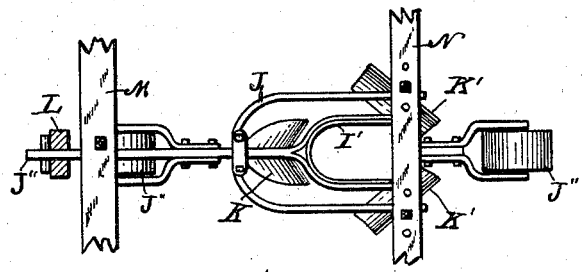
Fig. 9
Witnesses:  Inventor,

UNITED STATES PATENT OFFICE.

ALBERT M. TODD, OF KALAMAZOO, MICHIGAN.

PEPPERMINT-PLANTER.

SPECIFICATION forming part of Letters Patent No. 581,966, dated May 4, 1897.

Application filed February 10, 1896. Serial No. 578,787. (No model.)

*To all whom it may concern:*

Be it known that I, ALBERT M. TODD, a citizen of the United States, residing at the city of Kalamazoo, in the county of Kalamazoo and State of Michigan, have invented a certain new and useful Machine for Planting the Roots of Peppermint, of which the following is a specification.

My invention relates to a new and improved machine for planting the roots of peppermint or for similar purposes.

In the ordinary cultivation of peppermint or plants of that character the roots are planted by tearing them apart and burying them in trenches. This is a very laborious process, as the man carries a sack of the roots, tears them apart, and presses the dirt over them with his feet as he walks along. Numerous attempts have been made to secure a successful machine for planting the same, but, so far as I am aware, all of these machines have been failures, some for one reason, some for another.

The objects of my invention are, first, to produce a successful machine which can be operated by power; second, to produce a machine which shall more evenly distribute the roots than it has heretofore been possible to do; third, to provide a machine by the use of which it will be possible to plant a large area in a short time with a small number of men; fourth, to provide an improved planter which shall evenly cover the roots and compress them into the soil, as is required for a successful growth; fifth, to provide a machine which as it operates will cut off a quantity of the root and drop it at certain definite intervals to secure a proper distribution of the same without danger of clogging the machine, and further objects appearing definitely in the detailed description. I accomplish these objects of my invention by the devices and means described in the following specification and illustrated in the accompanying drawings, in which—

Figure 1:
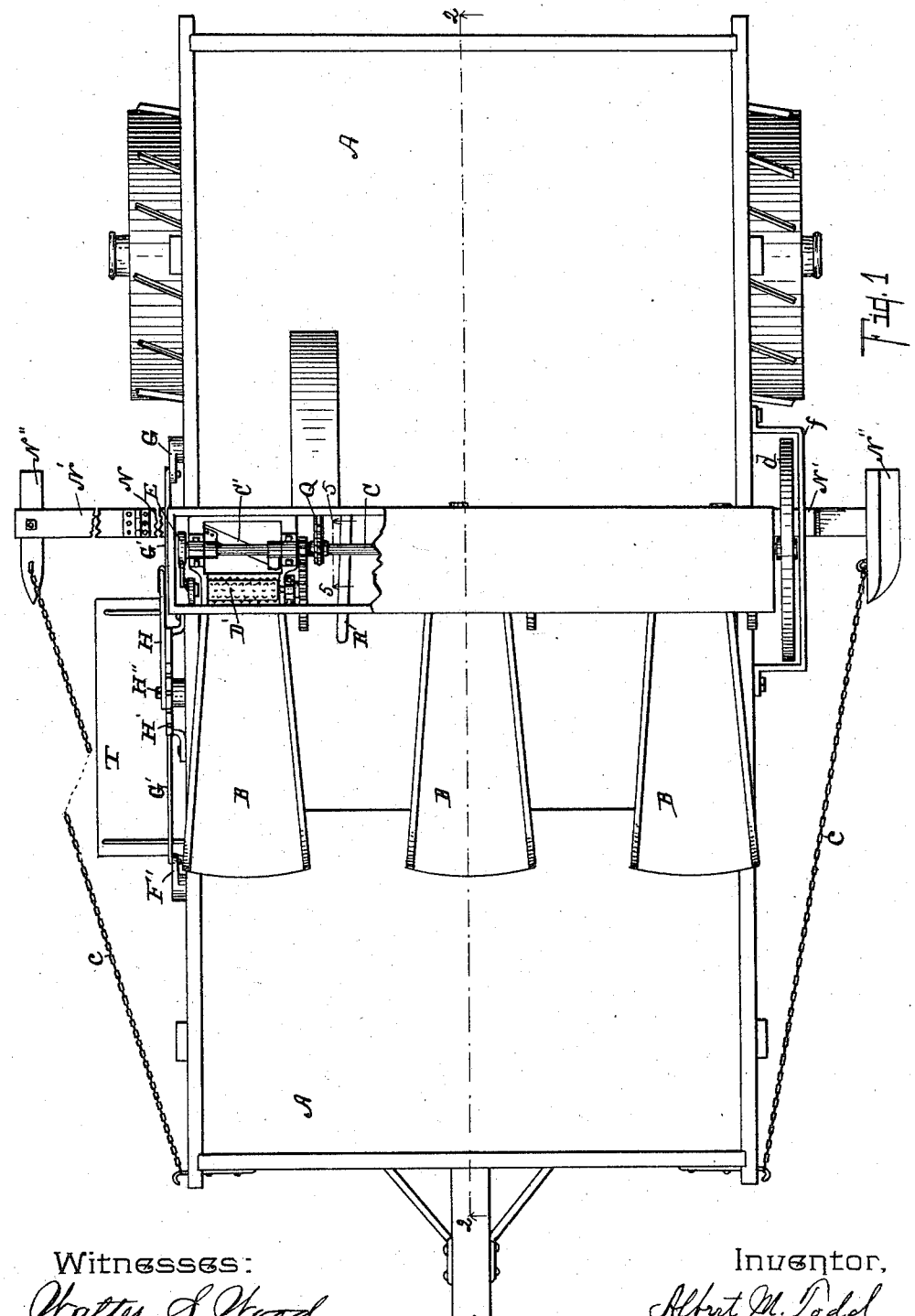
Figure 2:
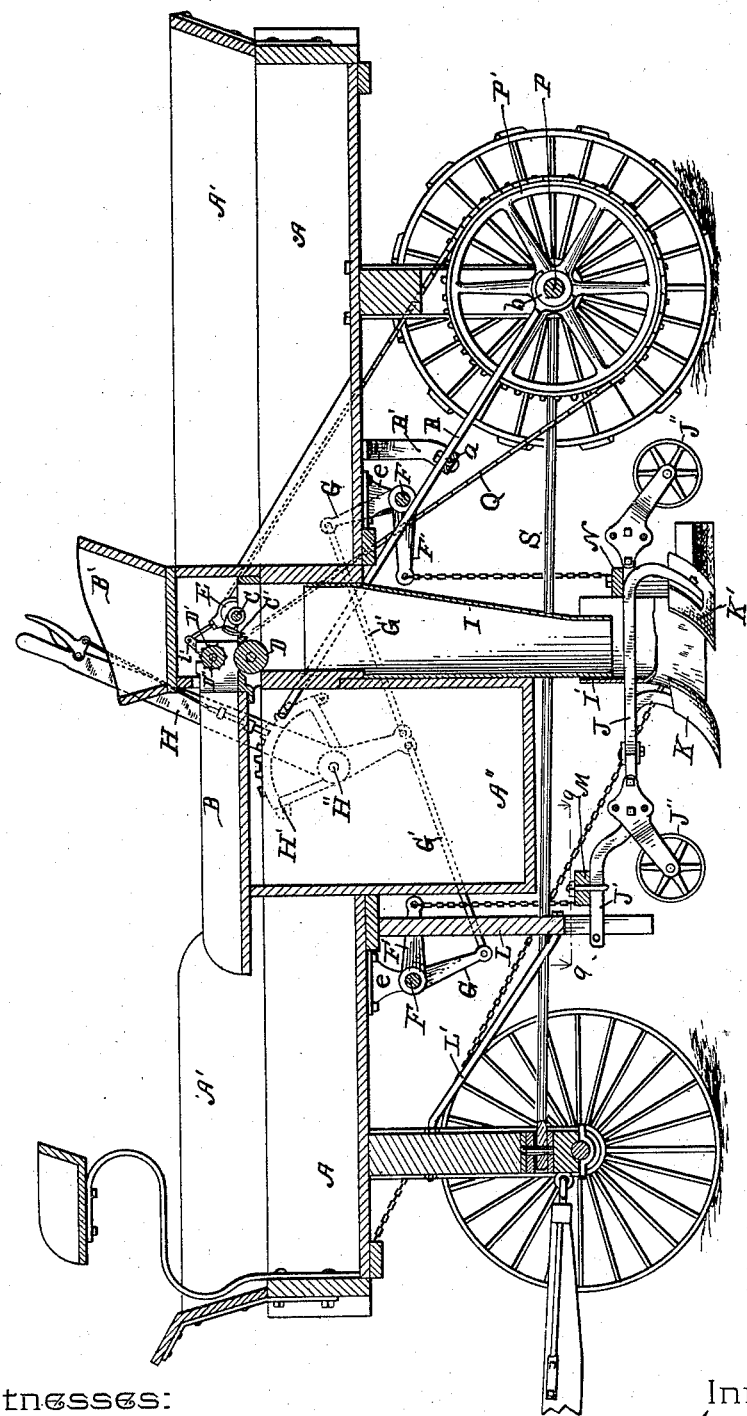
Figure 3:
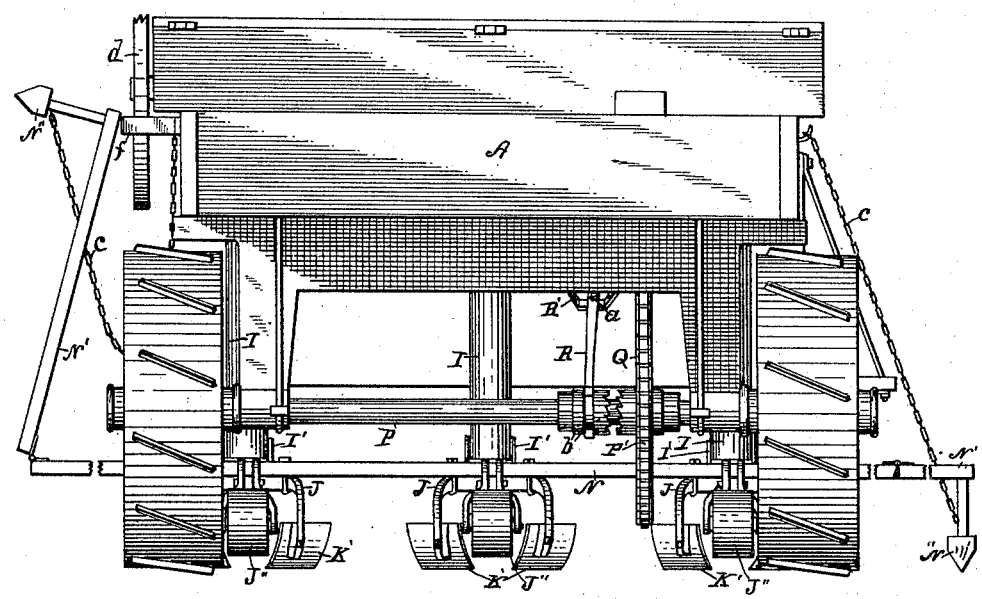
Figure 4:
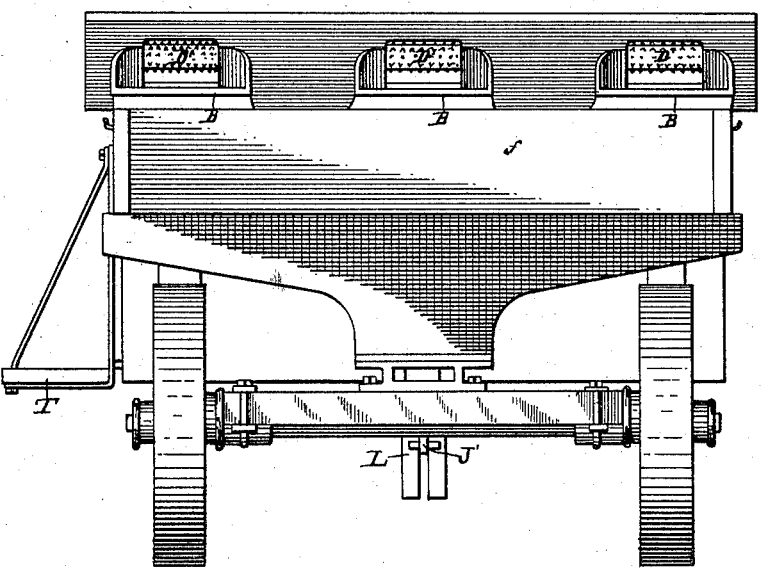

Figure 1 is a top plan view of my improved mint-planting machine, portions being broken away to show details of construction. Fig. 2 is a vertical sectional view of the same on line 2 2 of Fig. 1. Fig. 3 is a rear elevation of the same, portions of the marker being shown in sections. Fig. 4 is a front elevation of the machine, the lower portions not appearing. Fig. 5 is an enlarged detailed sectional view taken on line 5 5 of Fig. 1. Fig. 6 is an enlarged detailed view of the parts shown in Fig. 5, taken from the opposite end. Fig. 7 is an enlarged detail sectional view on line 7 7 of Fig. 8, illustrating the ratchet which actuates the feed. Fig. 8 is an enlarged detail sectional view on line 8 8 of Fig. 7. Fig. 9 is an enlarged detail plan sectional view, taken on line 9 9 of Fig. 2, of one of the furrowing, covering, and compressing portions of the machine. Fig. 10 is an enlarged detail view of the draft connection for the furrowing and covering portions.

All of the sectional views are taken looking in the direction of the little arrows at the ends of the section-lines, and similar letters of reference refer to similar parts throughout the several views.

Referring to the lettered parts of the drawings, A represents the broad platform-box, which is carried on suitable broad-faced wheels adapted to travel over the soft ground on which it is necessary to operate such a machine. Side boards A' are placed around the same to increase its capacity sufficiently to carry as large a quantity of the roots as it may be necessary to use. Between the front and rear wheels of the machine is a deep box or pit A'', in which the men stand who attend to the feeding of the machine. A platform T is at one side for the same purpose. A heavy reach S connects the front and rear running-gear of the vehicle. On the rear axle P, which is rigid with the rear wheels, is supported a large sprocket-wheel P'. A suitable clutch $b$, operated by the lever R, supported on pivot $a$ in hanger R', is provided to throw the machine into and out of gear.

Extending across the upper part of the box A near the center is a shaft C, which is carried in suitable bearings. Curved knives C' are rigidly secured to this shaft and operated next to a straight edge for cutting purposes, similar to the knives on an ordinary rotary lawn-mower. Feeding-boxes B, broad at their front ends and narrow toward the rear, are supported opposite these knives. An antifriction-roller D is close to and opposite the knife C'. Above this roll D is a toothed feed-roller D' on an axle D''. A pawl-and-ratchet mechanism consisting of the ratchet-wheel $h$, which has ratchet-teeth both on the inside and outside of its rim, with a pawl $g$ for engaging those on the outside. A pawl K, secured to the disk I and actuated from the lever I', is to engage the teeth on the inside to give the feed-roller a step-by-step feed motion. The outer end of the arm $i$ is connected to a pitman, which connects to an eccentric-ring E, which engages an eccentric on the shaft C, which carries the cutting-knives C'. From an inspection of this it will be seen that as the machine is drawn forward the shaft C will be rotated, which will cause the knife C' to be operated to cut the roots which may present themselves at the cutting-point. A balance-wheel $d$ is on the shaft C to properly control the same. This in its operation will actuate the eccentric E, which will, through their connections, actuate the levers $i$ intermittently, which will operate the feed-rollers intermittently and permit the knife C' to operate when the feed is idle. This will cut off the roots which are placed in the feed-box B and allow them to drop into the large tubes I, which project down close to the ground. The motion is thus very regular, and the sections of root are dropped exactly at the intervals required. At the bottom of each tube I is an instrument consisting of a plow K for cutting a furrow to receive the roots as they drop.

The depth to which the plow will run is controlled by a forward plow-wheel J'', which is adjustable. Just back of the furrow-plow K is an adjustable extension I' of the tube I, which is secured to the frame J below. This extension is open at the back to prevent clogging of the roots. Following this are the covering-plows K' K' to each side, which throw the soil over the roots as they drop into the trench. Back of these is a follower compressor-wheel J'', which compacts the earth over the row and also adjusts the depth to which the roots shall be covered by regulating the coverers K' K'. A beam J' extends forward from this frame J, and a cross-pin through the same is engaged by the lower end of the slotted standard L to insure that it will be properly drawn forward. A rod L extends from the forward bolster to this standard to brace the same. These planting implements are rigidly secured together by the bar M toward their forward end and the bar N at the rear.

On the under side of the box A are supported suitable rock-shafts F by hangers $e$. Arms F project out from these rock-shafts, and chains depend from the same and are secured at the bottom end to the beams M and N for controlling the planter implements below. Arms G project from each rock-shaft and are connected together and to the adjusting-lever by a rod G' for actuating both together to lift the planting implements above the ground beneath.

An adjusting-lever H is pivoted at H' and is connected to the rods G', which are joined to same at the center. A suitable notched segment H' and the usual catch and grip for operating the same are on lever H and serve to adjust the same, so that by throwing the lever H forward the planter implements can be lifted away from the soil, or by throwing the lever back they can be dropped into the soil in the operative position.

Markers M'' are carried to each side of the machine for the purpose of marking the central row for the next course of the machine. These are carried on hinged arms $n'$, and are controlled by chains $c$, which run to the main body of the machine above.

A suitable housing is placed over the top of the cutters to prevent the same from becoming clogged and protect the operators from injury. A small hopper or box is placed above the same.

In practice a quantity of roots are placed in the main box of the machine. A man stands by each feed channel or trough B and a boy or man keeps a supply of the roots constantly in the box B', or in convenient reach of the feeders. When the machine is in operation, the men, standing in the pit A'' and on the step T, keep a constant and even supply of the roots passing between the feed-rollers, where they are cut off in sections at proper intervals and dropped through the feeders I, and are properly buried and planted by the operation of the planting implements below.

In practice it will be found best to employ five persons to operate this machine. It will plant three rows at one and the same time, doing the work in a proper and satisfactory manner, and will enable the five men to plant on an average ten times as much as they could plant in the old way.

Having thus described my machine, I desire to state that it is capable of considerable variation in its details without departing from my invention. The exact number of planting implements employed upon it is not material, as only a single one need be used, though I have so arranged and constructed the machine that any number which any reasonable team-power can be employed to draw can be made use of.

Variations, no doubt, will readily suggest themselves to those skilled in the art to which this invention pertains as to a proper cutting mechanism for cutting the roots and feeding the same, and the exact form in which I have shown the planting implements themselves can also be considerably varied, as must also clearly appear. The exact construction I have shown in my device is, however, the one best adapted for the purpose.

Having thus described my invention, what I claim as new, and desire to secure by Letters Patent, is—

1. In a mint-planting machine the combination of the elevated platform-box A A carried on suitable running-gear below; the sprocket-wheel P' on the rear axle P; a suitable clutch b for throwing the same into gear; the transverse shaft C across the platform-box A; cutting-knives C' supported on said axle C similar to the knives of a lawn-mower; a sprocket-chain Q extending from the sprocket-wheel P' to a sprocket-wheel on the shaft C for actuating the same, feed boxes or chutes B opposite said knives; an antifriction-roller D in the bottom of each of said chutes opposite the cutting-knives C'; the toothed feed-roller D' supported on a shaft D'' above the roller D; a ratchet for actuating said feed-roller D'; a lever i projecting from said ratchet; a pitman connected with the eccentric E on the shaft D'' for imparting an intermittent motion to the feed-roller D' and a suitable covering device below for the purpose specified.

2. In a mint-planting machine, the combination of a suitable body portion, cutting-knives supported thereon; a power connection from the axle of said machine to said cutting-knives; suitable tubes I for delivering the sections of mint-root cut; planter implements supported beneath the main body of the machine consisting of a suitable frame J carrying an adjustable section of tube I' adjustable over the tube I; an adjustable roller or wheel J'' to the front thereof for regulating the depth of the trench; a furrowing-plow K in front of the tube I'; covering-plows K' K' to each side; an adjustable compressor-roller J'' to the rear of said frame for compressing the soil in the row and regulating the depth to which the roots shall be covered; suitable bars M and N for connecting the planter implements together; rock-shafts F F with arms F' F' connected by suitable chains to the cross-pieces M, N; projecting arms G, G, from said rock-shaft; an adjusting-lever H, pivoted at H''; connecting-rods G' G' extending from the arms G, G, and the lever H and a suitable notched segment H' for adjusting the same, all coacting together for the purpose specified.

3. In a mint-planting machine, the combination of a suitable body portion, a delivery-pipe leading down therefrom; a planter implement below consisting of an independent frame having a furrowing-plow K and covering-plows K' K' to follow the same and adjustable rollers J'' J'' at the front and rear of the same to regulate its action as to depth of cut and covering and compress the soil over the roots as specified.

4. In a mint-planting machine, the combination of a suitable platform-body for carrying a quantity of the roots; a transverse shaft across the same bearing a cutting-knife; suitable power connections from said shaft to the rear wheels of the machine; feed-rolls for carrying the roots to said cutting-knife; a ratchet to actuate said feed-rolls and a pitman operated from said transverse shaft to actuate the ratchet to operate the feed-rolls intermittently to control the supply of the roots to cut the same and distribute them evenly to planter implements below, as specified.

5. In a mint-planting machine, the combination of a suitable platform-body for carrying a quantity of the roots; a transverse shaft across the same bearing a cutting-knife; suitable power connections from said shaft to the rear wheels of the machine; feed-rolls for carrying the roots to said cutting-knife; a ratchet to actuate said feed-rolls and a pitman operated from an eccentric on said transverse shaft to actuate the ratchet to operate the feed-rolls intermittently to control the supply of the roots to cut the same and distribute them evenly to planter implements below, as specified.

6. In a mint-planting machine, the combination of a platform-body for carrying a quantity of roots, transverse shaft across the same; power connections to the driving-wheels to actuate said shaft; feed-rolls; ratchets to actuate the said feed-rolls; connections from said ratchets to the shaft to operate the feed-rolls intermittently to feed the roots to planter implements below for the purpose specified.

7. In a mint-planting machine, the combination of a platform-body; feed-rolls thereon; power connections from said feed-rolls to the driving-wheels coacting to feed the roots evenly, as specified.

8. In a mint-planting machine, the combination of a platform-body; power-cutting knives supported thereon; feed-rollers in connection with said knives; and power connections from said cutting-knives and feed-rolls to the driving-wheels of the machine to operate the same regularly to cut the roots and distribute them evenly, as specified.

In witness whereof I have hereunto set my hand and seal in the presence of two witnesses.

ALBERT M. TODD. [L. S.]

Witnesses:
WALTER S. WOOD,
CORA W. FULFORD.